G. P. MARINIER.
FARM IMPLEMENT.
APPLICATION FILED FEB. 9, 1916.

1,206,568.

Patented Nov. 28, 1916.
2 SHEETS—SHEET 1.

Inventor
G. P. Marinier

Witnesses

By Victor J. Evans
Attorney

G. P. MARINIER.
FARM IMPLEMENT.
APPLICATION FILED FEB. 9, 1916.

1,206,568.

Patented Nov. 28, 1916.
2 SHEETS—SHEET 2.

Witnesses

Inventor
G. P. Marinier
By Victor J. Evans
Attorney

UNITED STATES PATENT OFFICE.

GILBERT P. MARINIER, OF PONTIAC, MICHIGAN.

FARM IMPLEMENT.

1,206,568.

Specification of Letters Patent.

Patented Nov. 28, 1916.

Application filed February 9, 1916. Serial No. 77,233.

*To all whom it may concern:*

Be it known that I, GILBERT P. MARINIER, a citizen of the United States, residing at Pontiac, in the county of Oakland and State of Michigan, have invented new and useful Improvements in Farm Implements, of which the following is a specification.

This invention relates to farm implements, and it has for its object to produce a simple and efficient device of improved construction whereby an implement such as a plow or a cultivator may be conveniently mounted on a tractor or other wheeled frame in position for operation, and whereby such implement may be adjusted or moved to and from ground engaging position.

A further object of the invention is to produce a simple and improved construction and arrangement of parts whereby a beam for supporting an implement, such as a plow or a cultivator, may be adjustably connected with the frame of a farm tractor or other wheeled frame of any ordinary and conventional construction.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
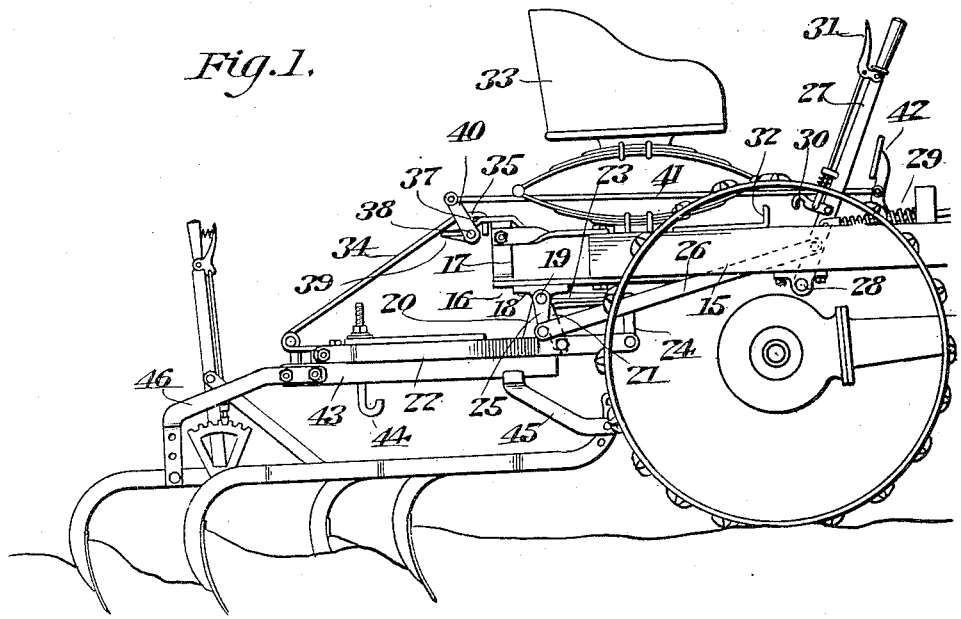
Figure 2:
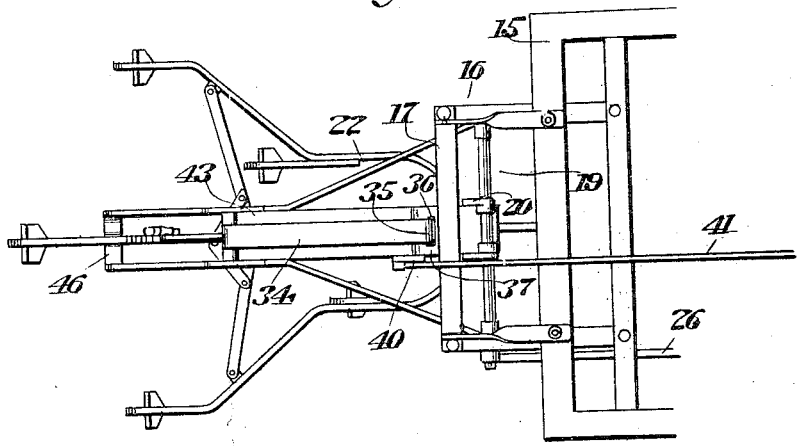
Figure 3:
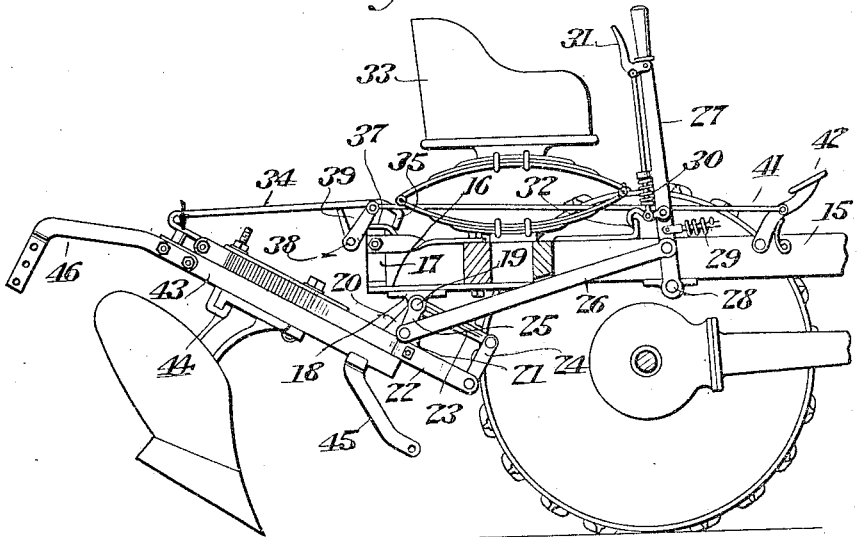
Figure 4:
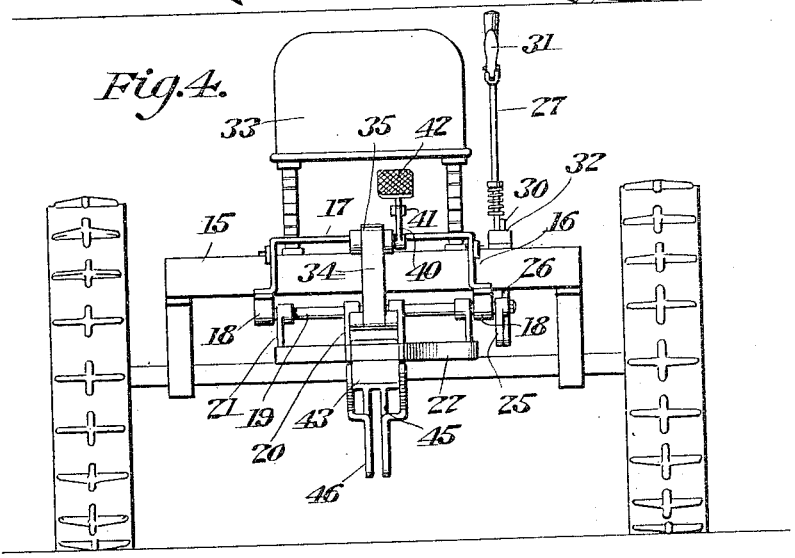

In the drawings, Figure 1 is a side elevation showing a portion of a tractor frame to which the invention has been applied, a cultivator being shown in ground engaging position. Fig. 2 is a top plan view of the same. Fig. 3 is a longitudinal sectional view, a plow being shown instead of a cultivator, and said plow being shown in raised position. Fig. 4 is a rear elevation of the cultivator frame having parts of the invention applied thereto, but the tilling implement having been removed.

Corresponding parts in the several figures are denoted by like characters of reference.

The frame 15 of the tractor is provided with rearwardly extending arms or brackets 16 that are connected together by an arch 17. The brackets 16 are provided with bearings 18 for a transverse shaft 19 having downwardly extending arms 20, 21 that are connected with the side members 22 of a substantially V-shaped frame which will be partly supported by said arms. The arms 20, 21 are divergently disposed with respect to the shaft 19, the arms 20 being extended downwardly and forwardly, while the arms 21 extend downwardly and rearwardly with respect to the shaft; thus, while the V-shaped frame may rock about the axis of the shaft 19 it will have no rocking movement with respect to the arms 20, 21. The shaft 19 also has an arm 25 that extends downwardly substantially at right angles to the arms 23 with which it combines to form a bell crank. The arm 25 is connected by a connecting rod 26 with a hand lever 27 which is fulcrumed at 28 on the tractor frame, said lever being pressed by a spring 29, whereby the weight of the V-shaped frame and the parts carried thereby will be partly counterbalanced. The hand lever 27 is also equipped with a stop member consisting of a hook 30 operable by means of a handle 31, whereby said hook may be placed in or out of engagement with a lug 32 secured on the tractor frame. The parts, it will be seen, are so arranged that the operator for whom a seat 33 is provided, by pulling the lever 27, may rock the shaft 19 through the medium of the connecting rod 26 and arm 25; the forwardly extending arms 23 being thereby depressed, thus depressing the forward extremities of the V-shaped frame by means of the links 24, the rearward portion of the frame and the parts carried thereby being thus lifted. This operation will be assisted by the spring 29. The V-shaped frame may be maintained in a raised position by engagement of the hook 30 with the lug 32.

Pivotally connected with the rearward end or apex of the V-shaped frame is a brace rod 34 having a terminal hook 35 which may engage a slot or recess 36 in a beveled keeper 37 which is supported on top of the arch 17. When the rearward portion or main portion of the V-shaped frame is in a relatively lowered position the notch 36 and the keeper 37 will be engaged by the hook 35 of the brace 34, and the said V-shaped frame will thus be very firmly sustained in position, the forward face of the hook 35 abutting on the arch 17, causing the brace to form a very stiff and rigid connection. To disengage the hooked members from the keeper, a rock shaft 38 is provided having a tongue 39 that extends beneath the brace member 34, said rock shaft being also provided with an arm 40 with which one end of a rod 41 is connected, said rod being guided beneath the seat 33 and connected at its forward end with a treadle or pedal 42 which is pivoted on the frame in convenient proximity to the foot of the operator, who, by exerting pressure on the treadle will cause the tongue 39 to engage the brace 34, lifting the latter so as to disengage the hook 35 from the slot or recess 36, this operation being obviously necessary before the device can be manipulated by the hand lever 27. When the hook or catch member 30 of the hand lever is released from the engaging member 32, the V-shaped frame with the parts carried thereby will gravitate in the direction of the ground, thus compressing the spring 29, the downward movement continuing until the hook 35 of the brace member 34 drops into engagement with the slot or recess 36.

Suitably bolted upon or otherwise secured with the V-shaped frame is a beam 43 with which a tilling implement, such as a plow P or a cultivator C may be connected; bolts including a hook bolt 44 being provided for the attachment of the plow and appropriate brackets 45, 46 being provided for the attachment of a cultivator. The tilling implement or ground engaging implements may be of any kind and of any appropriate construction, and the manner of attaching them to the beam and the latter to the V-shaped frame may be varied to any desired extent.

As will be seen from the foregoing description, taken in connection with the drawings hereto annexed, I have provided a very simple, inexpensive and effective device whereby a plow, a cultivator, or other similar implement that requires to be moved to and from ground engaging position may be conveniently attached to the frame of any ordinary farm tractor, the range of utility of which will thus be materially increased.

Having thus described the invention, what is claimed as new, is:—

1. The combination with a wheeled frame, of rearwardly extending brackets, a rock shaft carried thereby and having downwardly extending divergent arms, a frame having side members connected with and carried by said divergent arms, arms extending forwardly from the rock shaft, links connecting said arms with portions of the side members of the frame that extend forwardly with respect to the divergent arms, a crank arm extending downwardly from the rock shaft, a hand lever, and a rod connecting the hand lever with the crank arm.

2. The combination with a wheeled frame, of rearwardly extending brackets, a rock shaft carried thereby and having radially extending arms, a frame connected with and carried by said arms, and means for rocking the shaft to move the frame toward and from the ground, said means comprising a spring pressed hand lever, a crank arm connected with the rock shaft, and a rod connecting the crank arm with the hand lever.

3. The combination with a wheeled frame, of rearwardly extending brackets, a rock shaft carried thereby, a frame connected with and swingingly carried by the rock shaft, means including a hand lever for actuating the rock shaft, a brace member pivotally connected with the rearward end of the frame and having a terminal hook, and a keeper having a slot adapted to be engaged by the hook.

4. The combination with a wheeled frame, of rearwardly extending brackets, a rock shaft carried thereby, a frame connected with and swingingly carried by the rock shaft, means including a hand lever for actuating the rock shaft, a brace member pivotally connected with the rearward end of the frame and having a terminal hook, and a keeper having a slot adapted to be engaged by the hook; and means for releasing the hook from the keeper, said means including a rock shaft having a tongue engaging the brace and a radial arm, a foot lever, and a rod connecting the radial arm of the rock shaft with the foot lever.

5. A wheeled frame having rearwardly extending brackets and an arch connecting the same, a rock shaft carried by the bracket, a frame connected with and swingingly supported by the rock shaft, means for actuating the rock shaft including a spring pressed hand lever, a crank arm connected with the rock shaft, and a rod connecting the crank arm with the hand lever, a brace pivotally connected with the rearward portion of the frame and having a terminal hook, a keeper supported on the arch and having a slot adapted to be engaged by the hook, and pedal means for releasing the hooked brace from the keeper.

In testimony whereof I affix my signature in presence of two witnesses.

GILBERT P. MARINIER.

Witnesses:
 PIERRE SCHON,
 F. L. WILLITS.

Copies of this patent may be obtained for five cents each, by addressing the "Commissioner of Patents, Washington, D. C."